United States Patent [19]

de Zepeda-Bermudez

[11] 4,272,580

[45] Jun. 9, 1981

[54] DECORATIVE PARCHMENT PAPER

[76] Inventor: Rocio S. de Zepeda-Bermudez, Hoskins 4-D, Escondido Village, Stanford, Calif. 94305

[21] Appl. No.: 117,204

[22] Filed: Jan. 31, 1980

Related U.S. Application Data

[63] Continuation of Ser. No. 898,391, Apr. 19, 1978, abandoned.

[51] Int. Cl.³ .................. B32B 3/26; B32B 29/06
[52] U.S. Cl. ........................... 428/153; 428/156; 428/166; 428/178; 428/187; 428/212; 428/537
[58] Field of Search ............ 428/156, 212, 166, 153, 428/154, 187, 537, 178; 162/109, 187, 188, 206; 156/76, 83, 84, 85; 8/118, 119

[56] References Cited

U.S. PATENT DOCUMENTS

| | | | |
|---|---|---|---|
| 1,871,702 | 8/1932 | Kallander et al. | 156/76 |
| 2,274,363 | 2/1942 | Foulds et al. | 8/119 |
| 3,108,847 | 10/1963 | Taylor | 8/119 |
| 3,880,705 | 4/1975 | Tilburg | 162/206 |

*Primary Examiner*—Paul J. Thibodeau
*Attorney, Agent, or Firm*—Robert T. Gammons

[57] ABSTRACT

A decorative textured paper having a generally translucent background with randomly disposed opaque white areas is created by placing a dry first cloth on a hard, generally flat surface, then placing a moist second cloth over the first cloth with a third dry cloth placed over the moist second cloth. A parchment type paper is placed over the third dry cloth after which a preheated, hard, flat surface is applied to the paper and cloth pile with a sliding motion concurrently with compressing the paper and cloth layers to produce a discontinuous and randomly distributed puffed decorative pattern.

2 Claims, 3 Drawing Figures

2

DECORATIVE PARCHMENT PAPER

This is a continuation of application Ser. No. 898,391 filed Apr. 19, 1978, now abandoned.

BACKGROUND OF THE PRIOR ART

This invention relates generally to textured paper and in particular to methods of puffing paper to produce a decorative pattern including the puffed paper itself.

The prior art methods of creating textured paper include the use of patterned calendered rollers which emboss the decorative pattern into the paper either while the paper was in the wet pulp state or by heat and pressure after the paper is formed.

One method of puffing paper and other fibrous materials included the application of heat and pressure to a wet fabric material containing a puffing agent. Upon the sudden release of pressure in the manner of and explosion, the puffing agent vaporizes and expands carrying with it the fibers in the fabric material. Another method of puffing a fabric involves impregnating the fabric with a foaming compound which is activated using heat causing the foaming compound to expand carrying with it the fibers of the fabric.

SUMMARY OF THE INVENTION

The process and product of the present invention utilizes a porous fabric dampened with a liquid and placed between two dry porous fabrics with the paper placed against the outside surface of one of the dry porous cloths while the outside surface of the other dry cloth is placed against a hard, generally flat cold surface. A hot, generally flat second surface is placed against the paper to exert a pressure against the cloth and paper layers. At the same time the hot second surface is moved in a sliding motion across the surface of the paper.

The product produced by this process is a decorative paper comprising a generally translucent background having disposed thereon, in a random pattern, a plurality of generally opaque white puffed areas ranging in major dimension from approximately one sixteenth inch (0.159 cm.) to approximately one-half inch (1.27 cm.).

It is, therefore, an object of the present invention to provide a process for making a decorative pattern in parchment type paper.

It is a further object of the present invention to create a paper having a decorative pattern therein.

It is another object of the present invention to provide a process for puffing parchment type paper.

It is still another object of the present invention to provide a process for puffing parchment type paper in a discontinuous random pattern.

It is a further object of the present invention to provide a process for treating vellum paper to produce a decorative puffed pattern therein.

It is yet another object of the present invention to create a puffed pattern in vellum paper.

These and other objects of the present invention will be manifest upon a careful study of the following detailed description when taken together with the drawings.

DESCRIPTION OF THE PREFERRED EMBODIMENT

Apparatus

Figure 1:
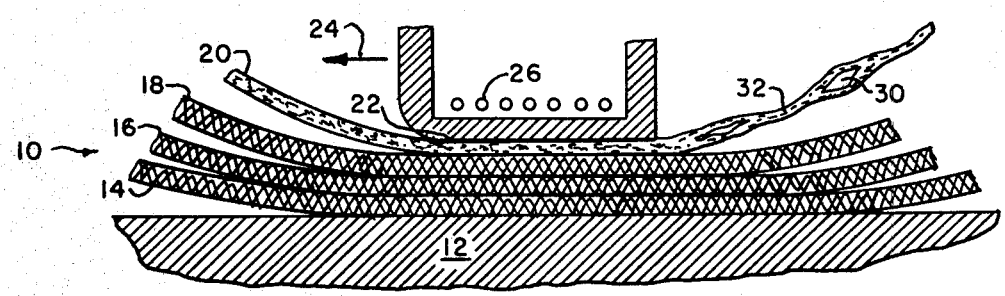
FIG. 1 is a cross-sectional, elevational view of the apparatus used for performing the process of the present invention.

With reference to FIG. 1, there is illustrated a cross-sectional, elevational view of the apparatus 10 for performing the process of the present invention which comprises, basically, a hard, generally flat first surface 12 on which is placed a dry first porous fabric 14. A second porous fabric 16, in which the pores of the fabric are impregnated with a liquid, is placed on top of first porous fabric 14, while a dry third porous fabric 18 is placed on top of second porous fabric 16.

A parchment type paper, 20, such as vellum paper, is placed on top of third porous fabric 18.

A second, generally flat surface 22 is applied to the top surface of paper 20 in order to apply a vertical pressure to both paper 20 and fabric layers 14, 16 and 18 against first surface 12. At the same time, second surface 22 is adapted to slide over the top surface of paper 20 in the direction of arrow 24. Instead, the sliding motion can consist of a sideways motion.

A set of electric resistance heating elements 26 are provided in second surface 22 to raise surface 22 to an appropriate temperature during its travel over paper 20 in order to activate the forces that create the unique decorative features.

For continuous operation, second surface 22 can be a moving cylinder (not shown) while porous fabrics 14, 16 and 18 can be belts which remain static as surface 22 is pressed against the paper 20 with a sliding motion. After sliding with pressure for a certain segment of paper, surface 22 then moves back to its original position while surface 12, together with porous fabrics 14, 16 and 18, and paper 20 moves to a new position with a new segment of paper 20 awaiting to be treated. Alternatively, the moving surface 22 can slide sideways (not shown).

Process

To perform the process of the present invention, dry first porous fabric 14 is placed on first surface 12. Then second porous fabric 16, which has been slightly moisturized with a volative liquid, such as water, is placed on top of first porous fabric 14 while dry third porous fabric 18 is placed on top of damp second porous fabric 16. Paper 20 is next placed on top of dry third porous fabric 18.

Second surface 22 is preheated by heating elements 26 to a relatively high temperature, preferably above the boiling point of the liquid contained in the pores of second porous fabric 16. It has been found that satisfactory results are achieved when the liquid in second porous fabric 16 is water and the temperature of second surface 22 ranges between 140 and 160 Degrees Celsius.

Second surface 22 is then placed on top of paper 20 and pressure applied to compress paper-fabric combination 14, 16, 18 and 20 against first surface 12 while simultaneously sliding surface 22 in the direction of arrow 24 over the surface of paper 20.

Product

Figure 2:
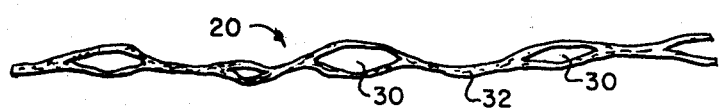
FIG. 2 is a cross-sectional view of the decorative paper produced by the process of the present invention.
Figure 3:
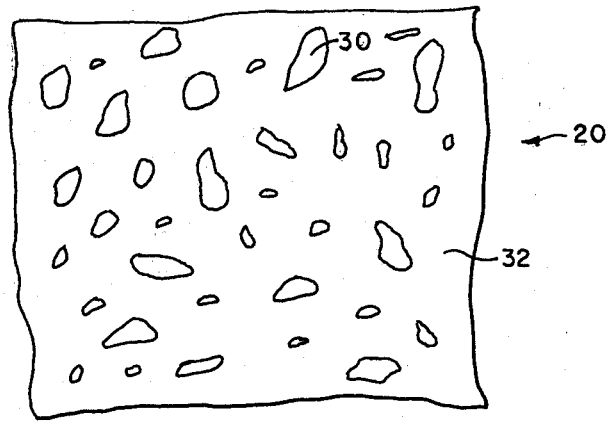
FIG. 3 is an illustration of the typical surface pattern of the decorative paper of the present invention.

As a result of the application of the above described process, paper 20 is transformed from a plane flat sheet into the configuration shown in FIGS. 2 and 3. In FIG. 2, decorative paper 20 now comprises a plurality of opaque white puffed areas 30 which define voids between the surfaces of the sheet and which are randomly distributed over the surface of the paper as shown in FIG. 3, varying in size from one-sixteenth (0.159 cm.) to one-half inch (1.27 cm.) in major dimension. In addition, paper 20 further comprises undulating portions 32 covering the entire surface of the paper.

It is to be observed that the puffed areas in the plane of the sheet vary in size (area) and in thickness perpendicular to the sheet, further, that the puffed areas extend from opposite faces of the plane of the sheet in different amounts and that the unpuffed areas vary in size (area) in the plane of the sheet and are substantially uniformly thick in the plane of the sheet.

Prior to being subjected to the steps of the previously described process, paper 20 can be impregnated with a translucency producing material such as a low gravity clear oil or other material common in the art.

Colored designs or lithographic printings can also be applied to the paper prior to initiating the process of the present invention.

The type of paper used herein is designated as "Micro 105 Highly Transparent, Vellum-Type 100% Rag Tracing Paper" and is manufactured by Chatvoz-Carsen Corporation, 5 Daniel Road, Fairfield, New Jersey 07006.

I claim:

1. A decorative paper comprising a single ply sheet of parchment paper characterized in that it embodies discrete interspersed, randomly-scattered puffed and unpuffed areas, said puffed areas varying in area in the plane of the sheet and in thickness perpendicular thereto and defining voids between the surfaces of the sheet in said areas and said unpuffed areas varying in area in the plane of the sheet and being of substantially uniform thickness in the plane of the sheet.

2. A decorative paper according to claim 1 wherein the puffed areas are opaque and the unpuffed areas are translucent.

* * * * *